United States Patent [19]
Kupcikevicius et al.

[11] 3,808,638
[45] May 7, 1974

[54] METHOD AND APPARATUS FOR PRODUCING A LARGE SAUSAGE PRODUCT HAVING A PRE-FLATTENED END

[75] Inventors: Vytautas Kupcikevicius, Chicago; Michael Joseph Myles, Downers Grove, both of Ill.

[73] Assignee: Union Carbide Corporation, New York, N.Y.

[22] Filed: Dec. 28, 1971

[21] Appl. No.: 212,914

[52] U.S. Cl. .................................................. 17/35
[51] Int. Cl. ............................................. A22c 11/00
[58] Field of Search .......................... 17/35; 141/313

[56] References Cited
UNITED STATES PATENTS
3,233,281  2/1966  Swift ...................................... 17/35

*Primary Examiner*—Robert Peshock
*Attorney, Agent, or Firm*—Franklyn Schoenberg

[57] ABSTRACT

A method and apparatus are provided for positioning a flat circular disc in a large sausage casing so that after the food casing has been stuffed with a food emulsion and the thusly stuffed food emulsion has been cooked and cured, there if obtained a large sausage product having a pre-flattened end.

6 Claims, 13 Drawing Figures

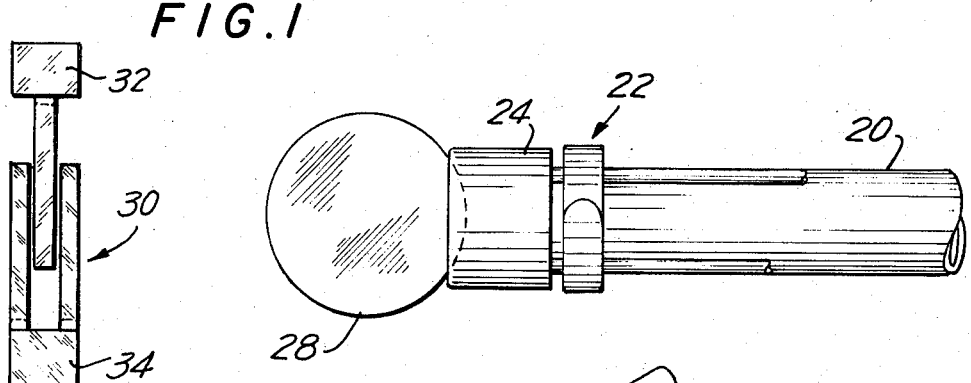
FIG.1
FIG.2
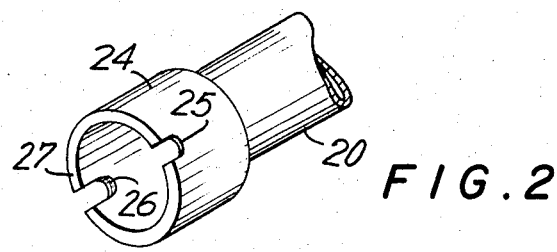
FIG.3
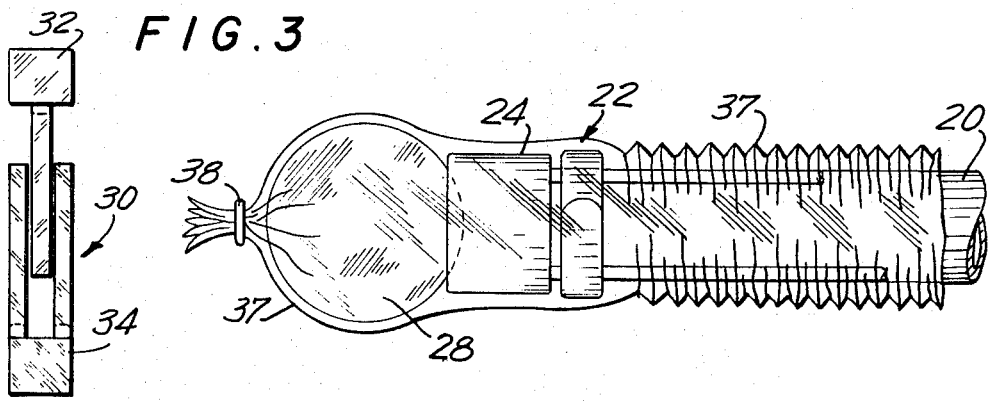
FIG.4
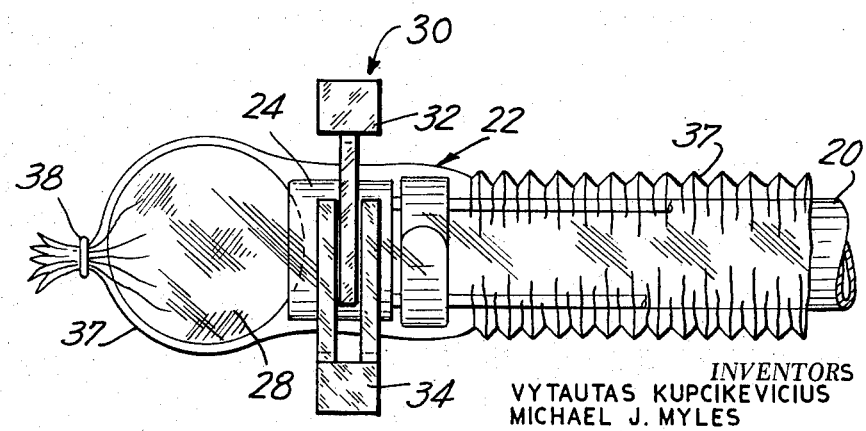
INVENTORS
VYTAUTAS KUPCIKEVICIUS
MICHAEL J. MYLES
BY
ATTORNEY

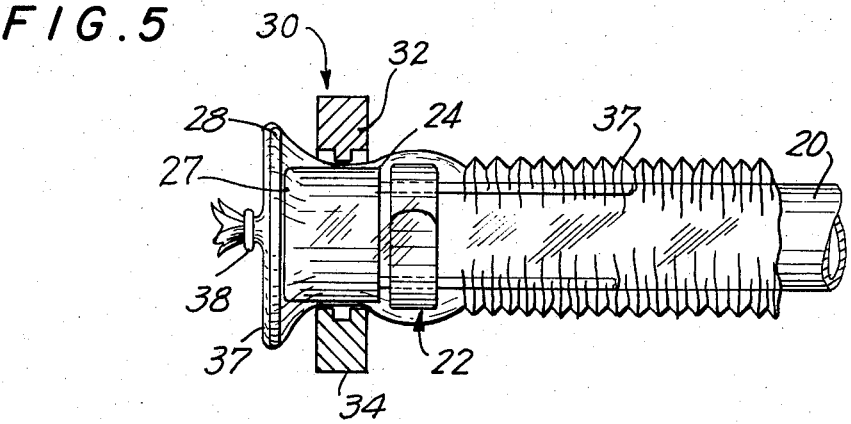
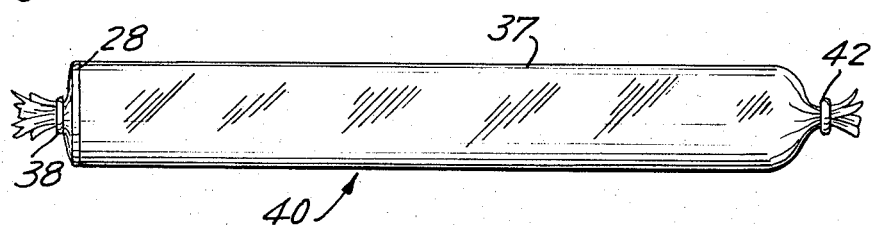
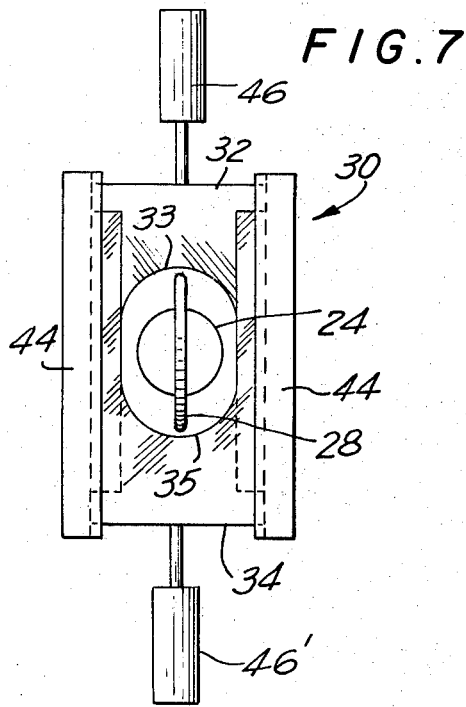
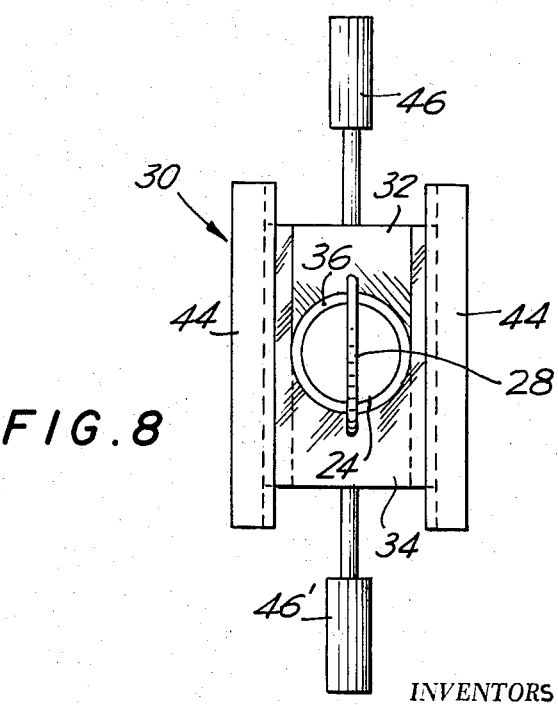

METHOD AND APPARATUS FOR PRODUCING A LARGE SAUSAGE PRODUCT HAVING A PRE-FLATTENED END

This invention relates to the production of large sausage products having a pre-flattened end. More particularly, this invention relates to a method and apparatus for positioning a flat circular disc in one end of a large sausage casing before the casing is stuffed with a food emulsion.

Large sausage casings are generally manufactured from such materials as regenerated cellulose, cellulose and cellulose having fibrous webs embedded therein and are employed in the manufacture of large sausage products such as salami and bologna sausages, spiced meat loafs, cooked and smoked ham butts and the like. These large sausage casings are produced in flat widths ranging in size from about 2 to 15 inches and range in length from about 14 to 72 inches and longer. The large sausage casings most commonly used for commerical production of large sausage products range in size from about 3 to 8 inches in flat width and from about 18 to 48 inches in length.

In the production of a large sausage product, a large sausage casing is first gathered over the end of a stuffing horn and then stuffed with a food emulsion. The thusly stuffed and encased food emulsion is subsequently cooked and cured according to conventional processes. Many of these large sausage products are thereafter sliced and packaged into units of predetermined weight and slice count for retail sale. The slicing equipments employed in such packaging operations are pre-set to yield a specific weight-by-slice count for use in obtaining unit packages of equal weight. Since a large sausage casing stuffed with a food emulsion has two generally hemispherical, rounded ends, these rounded ends are generally not used in producing equal weight packages and are either discarded or reworked.

In order to minimize the waste resulting from these rounded ends, many prior attempts have been made to flatten them by utilizing a variety of well known methods and apparatus. While such attempts have attained some degree of success, none has proved to be entirely satisfactory, since the amount of waste resulting from the rounded ends has not been substantially reduced.

It is an object of this invention to provide a method and apparatus for obtaining a large sausage product having at least one pre-flattened end.

This and other objects of the invention will become apparent from the ensuing discussion.

The objects of the invention can be generally attained by providing a method and apparatus for supporting a flat circular disc at the discharge end of a stuffing tube; sheathing a large sausage casing over the thusly supported disc; positioning the flat circular disc within the large sausage casing so that the flat surfaces of the disc are transverse to the discharge end of the stuffing tube; stuffing the large sausage casing with a food emulsion against the flat, circular disc positioned therein; and, cooking and curing the thusly stuffed food emulsion.

The method and apparatus of this invention can be generally used with commercial stuffing apparatus, but are particularly well suited for adaptation and use with the stuffing apparatus disclosed in U.S. Pat. No. 3,457,588 and 3,621,513. In the apparatus of these U.S. Patents, there is provided a pre-sizing means mounted near the outlet end of a stuffing tube, the pre-sizing means being capable of simultaneously and uniformly expanding a large sausage casing internally to a predetermined peripheral dimension before it is stuffed with a food emulsion. There is also provided a tubular collar or a cylindrical stoppering sleeve mounted adjacent the discharge end of the stuffing tube. Additionally, an emulsion stoppering ring is mounted in a spaced-apart relationship at the discharge end of the stuffing tube and, during operation of these apparatus, serves to prevent food emulsion from flowing back over the outside of the stuffing tube during and after stuffing of a large sausage casing.

The invention will become more clear when considered together with the accompanying drawing wherein:

FIG. 1 is a schematic side elevational view of a portion of the apparatus of the invention showing a flat circular disc releasably supported at the discharge end of a stuffing tube;

FIG. 2 is a perspective view of a portion of a tubular collar member mounted at the discharge end of the stuffing tube;

FIG. 3 is a view similar to that of FIG. 1 illustrating a large sausage casing sheathed over the flat circular disc;

FIGS. 4 and 5 are views similar to that of FIG. 1 showing various components of the apparatus in sequential operating positions;

FIG. 6 is a side elevational view of a large sausage product obtained through the use of the apparatus of FIG. 1;

FIGS. 7 and 8 are end elevational views illustrating the sequential operation of one embodiment of a stoppering component employed with the apparatus shown in FIG. 1;

Figure 9:
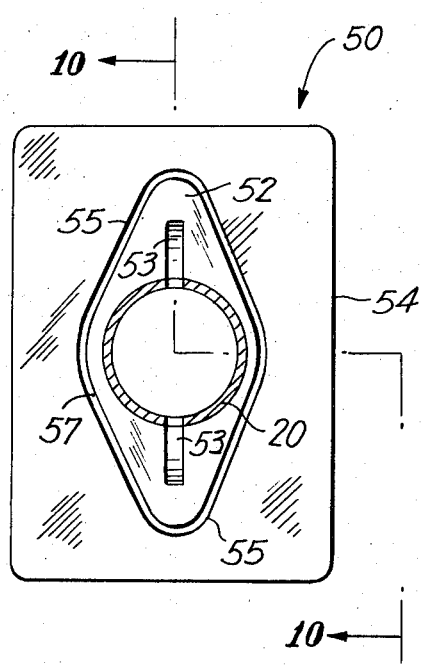
FIG. 9 is an end elevational view of another embodiment of a stoppering component of the apparatus of the invention.

Referring now to the drawing there is shown in FIG. 1 a stuffing tube identified by reference numeral 20 having a presizing means generally denoted by reference numeral 22 and a tubular collar 24 mounted at the discharge end of the stuffing tube 20. The stuffing tube 20, the pre-sizing means 22, and the tubular collar 24 can be the same as or similar to these components as disclosed and described in the patents identified hereinabove. The other end of stuffing tube 20 is connected to a conventional supply source of food emulsion (not shown).

Positioned adjacent the discharge end of the stuffing tube 20, there is shown an expandable stoppering ring, generally denoted by reference numeral 30 having upper and lower elements 32, 34, respectively.

In FIG. 2, it can be seen that the outlet end of tubular collar 24 has defined therein two slots 25 and 26 which are positioned opposite each other at 180° in the edge circumference 27 of tubular collar 24. Slots 25, 26 are of a size and configuration to releasably frictionally secure a flat circular disc 28 therein as shown in FIGS. 1, 3 and 4. The flat circular disc 28 is gripped in the tubular collar 24 in a manner whereby the flat surfaces of the disc 28 are aligned with the axis of the stuffing tube 20.

In FIG. 3 a large sausage casing 37 having a pre-tied or clip-closed end 38 is shown sheathed over and about the flat circular disc 28, the tubular collar 24 and the pre-sizing means 22, and is extended along a portion of the stuffing tube 20.

FIG. 4 illustrates the expandable stoppering ring 30 after it has been advanced to the stuffing position while in its expanded position and indexed about tubular collar 24. FIG. 5 shows the expandable stoppering ring 30 with its upper and lower elements 32, 34 in their closed position closely encircling tubular collar 24.

Referring now to FIGS. 7 and 8, expandable stoppering ring 30 assembly comprises a pair of vertical, slotted members 44 mounted on a carriage not shown. Upper and lower elements 32, 34 are slideably supported in the members 44. Upper element 32 is provided with a semi-circular arc 33 in its bottom edge while lower element 34 is provided with a cooperating semi-circular arc 35 in its upper edge. Elements 32, 34 are each secured to the rod end of pneumatic cylinders 46, 46'. The cylinders 46, 46' are adapted to raise and lower upper and lower elements 32, 34. When actuated to be in a closed position, upper and lower elements 32, 34 define an annular passage 36 (FIG. 8) about the collar 24.

The elements 32, 34 of expandable stoppering ring 30 should preferably be from about ¼ to 3.0 inches thick. These elements of the ring 30 may be made up of a plurality of pieces. Thus, when the upper and lower elements 32, 34 are in their closed position encircling tubular collar 24, the length of the annular passage 36 (FIG. 8) formed thereby is also from about ¼ to 3.0 inches. The annular passage 36 between the expandable stoppering ring 30 and the outer circumferential surface of the tubular collar 24 should be from about 1/32 to 1/8 inch in order to provide sufficient clearance for the wall of a large sausage casing 37 to pass therethrough. When in its closed position, expandable stoppering ring 30 functions in a manner similar to that of the apparatuus disclosed and described in U.S. Pat. No. 3,621,513.

In FIG. 5 the flat circular disc 28 is shown after being rotated 90° and positioned adjacent the pre-tied end 38 of the food casing 37 with the flat surfaces of the flat circular disc 28 transverse to the longitudinal axis of the stuffing tube 20.

FIG. 6 depicts a large sausage product, generally designated by reference numeral 40, having one pre-flattened end formed by the flat, circular disc 28 positioned therein. Reference numeral 42 designates the last closed end of the large sausage product 40.

Figure 10:
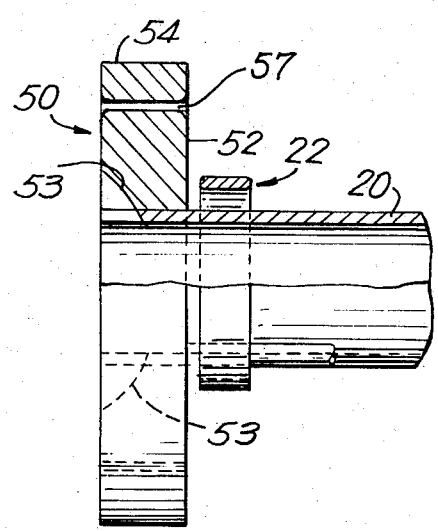
FIG. 10 is a side elevational view partially in section along the line 10—10 of FIG. 9; and, FIGS. 11–13 are schematic side elevational views illustrating sequential operations when the apparatus of FIGS. 9 and 10 are employed.
Figure 11:
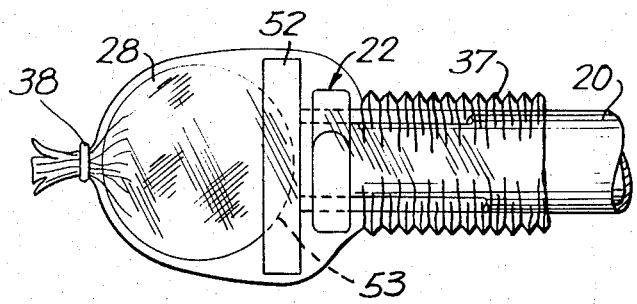
Figure 12:
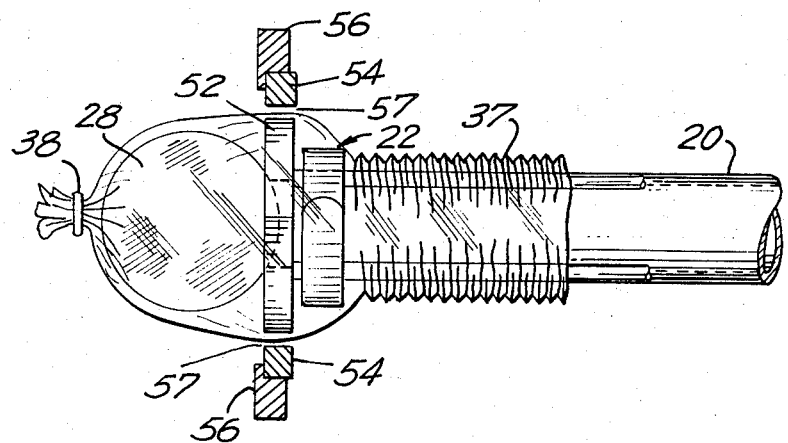

In FIG. 9 there is shown another embodiment of the apparatus of the invention comprising a collar-stoppering assembly generally identified by reference numeral 50. Collar-stoppering assembly 50 consists of a diamond-shaped collar member 52 and a stoppering member 54. Stoppering member 54 has defined in its body a diamond-shaped opening 55 fabricated so that stoppering member 54 can be positioned about collar member 52. When stoppering member 54 is positioned about collar member 52, there is defined therebetween a diamond-shaped annular passage 57. Collar member 52 also has defined therein a vertical elongate slot 53 (FIGS. 9 and 10) which is formed so that a flat circular disc 28 can be releasably supported therein (FIGS. 11 and 12). Additionally, collar member 52 is fabricated so that it can be mounted at the discharge end of a stuffing tube 20 (FIGS. 9 and 10) in the same manner as tubular collar 24 (FIGS. 1 and 3-5).

Figure 13:
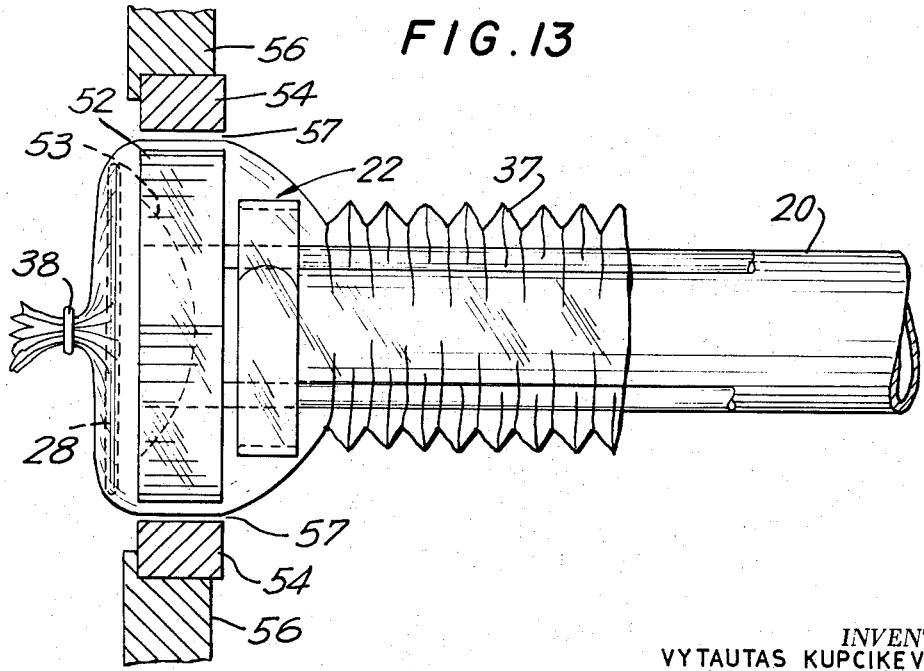

In FIG. 11 the arrangement of the casing 37 over the collar 52 is shown, the collar 52 being adjacent the outlet end of the stuffing tube 20. The stoppering member 54 is indexed into and out of position with collar member 52 by means of a conventional, pneumatically actuated cylinder (not shown) whose piston is attached to a support carriage member 56 (FIGS. 12-13). The width of collar 52 and the width of the stoppering member 54 should each be such that when they are arranged in their operative positions, as shown in FIGS. 9, 12 and 13, an elongate passage 57 (FIGS. 12 and 13) is defined between the member 54 and the collar 52 enabling these elements to function in the same manner as described above with regard to tubular collar 24 and expandable stoppering ring 30 (FIG. 5).

In FIG. 13 the flat circular disc 28 is shown after it has been rotated 90° within the large sausage casing 37 so that its flat surfaces, are traverse to the longitudinal axis of the stuffing tube 20.

A typical operation of the apparatus of the invention will now be described and will be more readily appreciated when considered together with the accompanying drawing.

With reference first to FIGS. 1-8, prior to sheathing a large sausage casing 37 over the tubular collar 24, pre-sizing means 22 and stuffing tube 20, a flat circular disc 28 is releasably supported in slots 25, 26 of the tubular collar 24 (FIG. 2) so that the edge of the flat circular disc 28 extends partially into tubular collar 24 and the flat surfaces of the flat circular disc 28 are disposed in general alignment with the longitudinal axis of the stuffing tube 20, (FIG. 1). A large sausage casing 37 having a pre-tied end 38 is then sheathed over and about the thusly supported flat circular disc 28 and over the tubular collar 24 and pre-sizing means (22) and extended partially along the stuffing tube 20 (FIGS. 3 and 4). Next, the expandable stoppering ring 30 with its elements 32, 34 in their expanded position (FIGS. 1, 3, 4 and 7) is advanced over the supported flat circular disc 28 by means of a conventional pneumatic cylinder (not shown) until the upper and lower elements 32, 34 of the expandable stoppering ring 30 are indexed adjacent to and about tubular collar 24 as shown in FIG. 4.

The construction of expandable stoppering ring 30 enables it to be advanced over the flat circular disc 29 releasably supported in the tubular collar 24 while its upper and lower elements 32, 34 are in their expanded position without disturbing the thusly supported flat circular disc 28. After the expandable stoppering ring 30 has been indexed past the thusly supported flat circular disc 28, it can then be contracted with respect to tubular collar 24 by closing upper and lower elements 32, 34.

The flat circular disc 28 is removed from slots 25, 26 in tubular collar 24 and manually rotated about 90° within the large sausage casing 37 until its flat surfaces are transverse to the longitudinal axis of stuffing tube 20. The large sausage casing is now drawn along the stuffing tube 20 until its pre-tied end 38 is closely adjacent one flat surface of the flat circular disc 28 and the other flat surface of the flat circular disc 28 abuts the circumferential edge 27 of tubular collar 24 (see FIG. 5). The upper and lower elements 32, 34 of the expandable stoppering ring 30 are now actuated by means of pneumatic cylinders 46 to their closed, intermeshed position about tubular collar 24 as shown in FIGS. 5 and 8. Prior to admitting a food emulsion into the thusly positioned large sausage casing 37, the elements of the pre-sizing means 22 are actuated in the same manner as disclosed and described in U.S. Pat. No. 3,457,588, to internally expand the large sausage casing 37 to a predetermined size. A food emulsion is now admitted under pressure into the large sausage casing 37. As the food emulsion enters the large sausage casing 37, it contacts the flat surface of the flat circular disc 28 forcing it away from the stuffing tube 20 thereby unsheathing the large sausage casing 37 until it is filled with a food emulsion to a desired or required length.

During stuffing, the expandable stoppering ring 30 indexed at the tubular collar 24 serves to function in the same manner as do their respective components in Pat. No. 3,621,513. That is, a dynamic seal is created in the elongate annular passage 39 formed between the expandable stoppering ring 30 and the tubular collar 24 (FIG. 5).

After the large sausage casing 37 has been stuffed, its last filled end is tied and, as shown in FIG. 6, a large sausage product 40 is obtained ready to be cooked and cured and further processed.

In operation, the collar-stoppering assembly 50 shown in FIGS. 9-13 functions in much the same manner as the expandable stoppering ring 30 described hereinabove. Thus, as shown, the diamond-shaped collar member 52 is mounted at the discharge end of the stuffing tube 20 (FIGS. 10-13). A flat circular disc 28 is inserted into and releasably supported by the vertical slot 52 in the collar member (FIGS. 11 and 12). A large sausage casing 37 is sheathed over and about the flat circular disc 28, the collar member 52, the presizing means 22, and along a portion of the stuffing tube 20 (FIG. 11) in the same manner as described hereinabove. The stoppering member 54 is then advanced over and about the thusly positioned flat circular disc 28 until it is indexed to mate with the collar member 52 as shown in FIGS. 12 and 13. The flat circular disc 28 is then removed from slot 53 in collar member 52 and manually rotated about 90° within the large sausage casing 37.

The diamond-shaped construction of collar member 52 and the diamond-shaped opening 55 formed in the body of stoppering member 54 (FIG. 9) enables the stoppering member 54 to be advanced past a flat circular disc 28 to be indexed at the collar member 52 while a flat circular disc 28 is being releasably supported in slot 53 of collar member 52 without disturbing the thusly supported flat circular disc 28. Hence, it can be seen that the annular passage is formed simply by the configuration of the stoppering member 54 and the mating collar member 52. After the stoppering member 54 has been indexed at the collar member 52, these components serve to function during stuffing in the same manner as do their respective components shown and described in Pat. No. 3,621,513 referred to hereinabove. It should be understood, therefore, that during stuffing a dynamic seal is also created in the diamond-shaped annular passage 57 formed between stoppering member 54 indexed at collar member 52 (FIGS. 9, 12 and 13).

Stuffing of the large sausage casing 37 with a food emulsion proceeds in the same manner as described hereinabove.

While the invention has been described in some detail and with particularity it should be understood that changes, modifications and alterations can be made therein without departing from the scope and spirit of the invention.

What is claimed is:

1. An apparatus for stuffing a food casing to provide a large sausage product which comprises:
   a. a stuffing tube having an inlet end and a discharge end;
   b. a support means mounted at the discharge end of the stuffing tube for releasably, frictionally securing a flat circular disc with its flat surfaces in general alignment with the longitudinal axis of the stuffing tube; and
   c. means cooperating with said support means forming an annular passage therebetween through which the wall of a large sausage casing passes as the large sausage casing is being stuffed whereby means are provided for preparing a large sausage product with a pre-flattened end.

2. The apparatus of claim 1 wherein said support means comprises a tubular collar, the edge circumferential surface of which has at least two slots defined therein opposite each other at 180°.

3. The apparatus of claim 1 wherein said support means comprises a diamond-shaped collar member having an elongated vertical slot formed therein.

4. The apparatus of claim 2 which includes;
   a. an expandable stoppering ring mounted in spaced-apart relationship with respect to the tubular collar;
   b. means for indexing said expandable stoppering ring while in its expanded condition past said disc adjacent said tubular collar; and
   c. means for closing the expandable stoppering ring about said tubular collar such that the elongate annular passage is defined between said ring and said collar.

5. The apparatus of claim 3 which includes:
   a. a stoppering member having a diamond-shaped opening defined in its body and mounted in spaced-apart relationship with respect to the collar member; and,
   b. means for indexing said stoppering member past said disc and about the diamond-shaped collar member such that a diamond-shaped annular passage is defined between said stoppering member and said collar member.

6. The apparatus of claim 4 wherein the expandable stoppering ring comprises:
   a. a pair of slotted members;
   b. an upper and lower element slideably supported in the slotted members, the upper element having a semi-circular arc formed in its bottom portion and the lower element having a semi-circular arc formed in its upper portion; and,
   c. means for raising and lowering the upper and lower elements toward and away from each other.

* * * * *